United States Patent [19]
Alexander et al.

[11] Patent Number: 4,720,133
[45] Date of Patent: Jan. 19, 1988

[54] CONVERTIBLE TOP STRUCTURE

[75] Inventors: Michael P. Alexander, Grosse Ile; William A. Sims, Lincoln Park, both of Mich.

[73] Assignee: ASC Incorporated, Southgate, Mich.

[21] Appl. No.: 828,014

[22] Filed: Feb. 10, 1986

[51] Int. Cl.⁴ .............................................. B60J 7/12
[52] U.S. Cl. .................................... 296/117; 296/116; 296/122
[58] Field of Search ............... 296/107, 109, 111, 116, 296/117, 120 A, 120 R, 122

[56]       References Cited
    U.S. PATENT DOCUMENTS

|   |   |   |   |
|---|---|---|---|
| 387,077 | 7/1888 | Jacobs | 296/122 |
| 2,040,680 | 5/1936 | Westrope | 296/107 |
| 2,747,928 | 5/1956 | Olivier et al. | 296/107 |
| 2,768,857 | 10/1956 | Albrecht | 296/117 |
| 2,860,913 | 11/1958 | Kuiper et al. | 296/107 |
| 2,895,764 | 7/1959 | Himka et al. | 296/117 |
| 3,047,332 | 7/1962 | Carpenter | 296/116 |
| 3,053,567 | 9/1962 | Geiger | 296/107 |
| 3,323,830 | 6/1967 | Husko et al. | 296/116 |
| 3,994,524 | 11/1976 | Lehmann | 296/107 |
| 4,573,732 | 3/1986 | Muscat | 296/108 |

FOREIGN PATENT DOCUMENTS 1248921 10/1971 United Kingdom ................ 296/107

Primary Examiner—Dennis H. Pedder
Attorney, Agent, or Firm—Arnold S. Weintraub

[57]            ABSTRACT

A manually operated convertible top structure for vehicles having a pivotal tonneau mounted rearward of the passenger compartment. The convertible top structure includes a pair of spaced rigid side rails which are interconnected by a plurality of spaced, transversely extending crossbows to form a frame work over which a flexible folding top is disposed. A pair of rear rails extending in a substantially upright orientation are pivotally mounted to the vehicle at one end and are connected by a control linkage to the side rails. The rearmost crossbow is pivotally connected to a mounting bracket attached to the vehicle. The side rails are pivotally connected to the frontmost crossbows for outward lateral movement as the top structure is lowered. An over-center lock formed of first and second links is pivotally connected between the rear rails and the rearmost crossbow for positively locking the rearmost crossbow on the tonneau when the convertible top structure is in its raised position. A locating pin centrally mounted on the rearmost crossbow engages an aperture centrally formed in the tonneau for locating the rearmost crossbow with respect to the tonneau of the vehicle.

3 Claims, 7 Drawing Figures

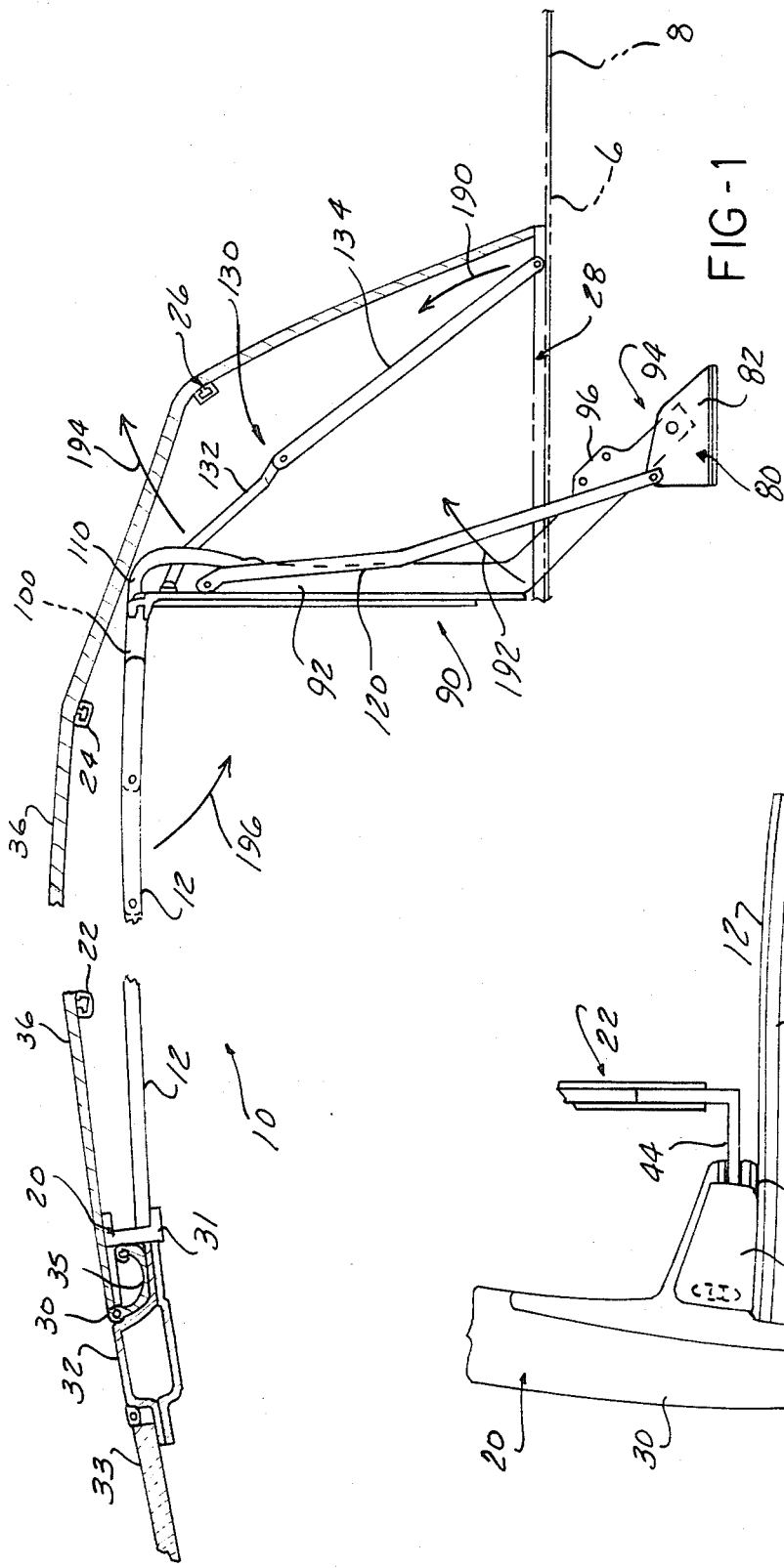

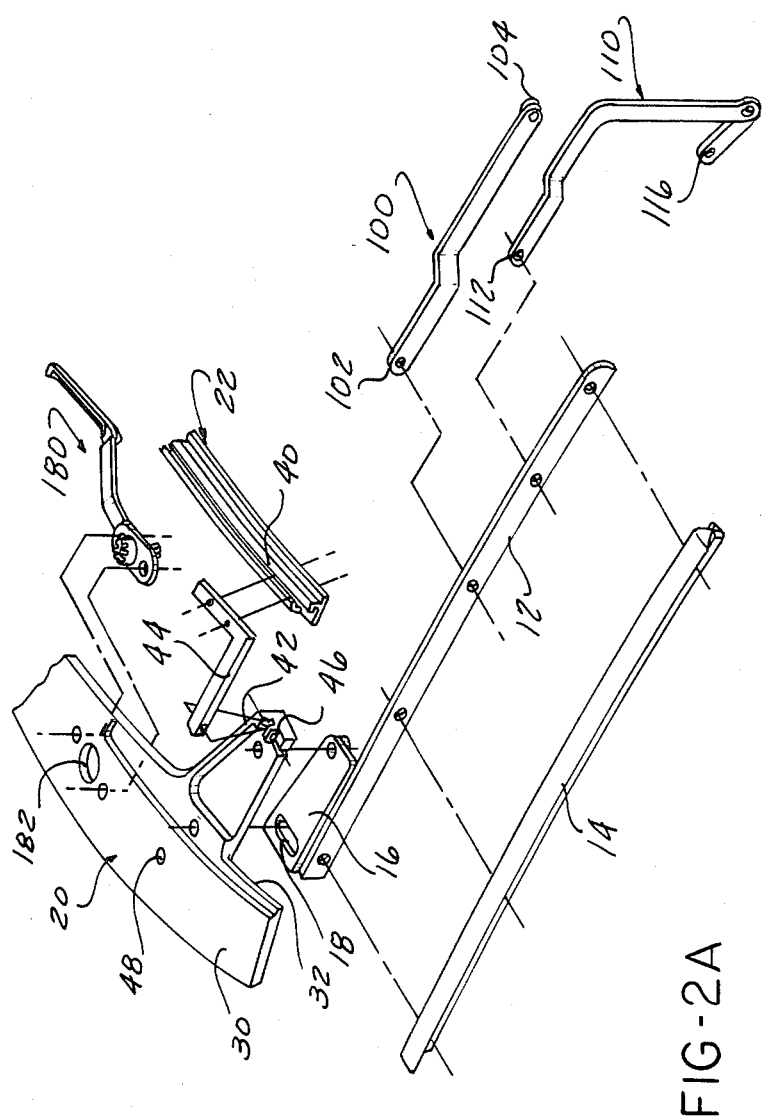

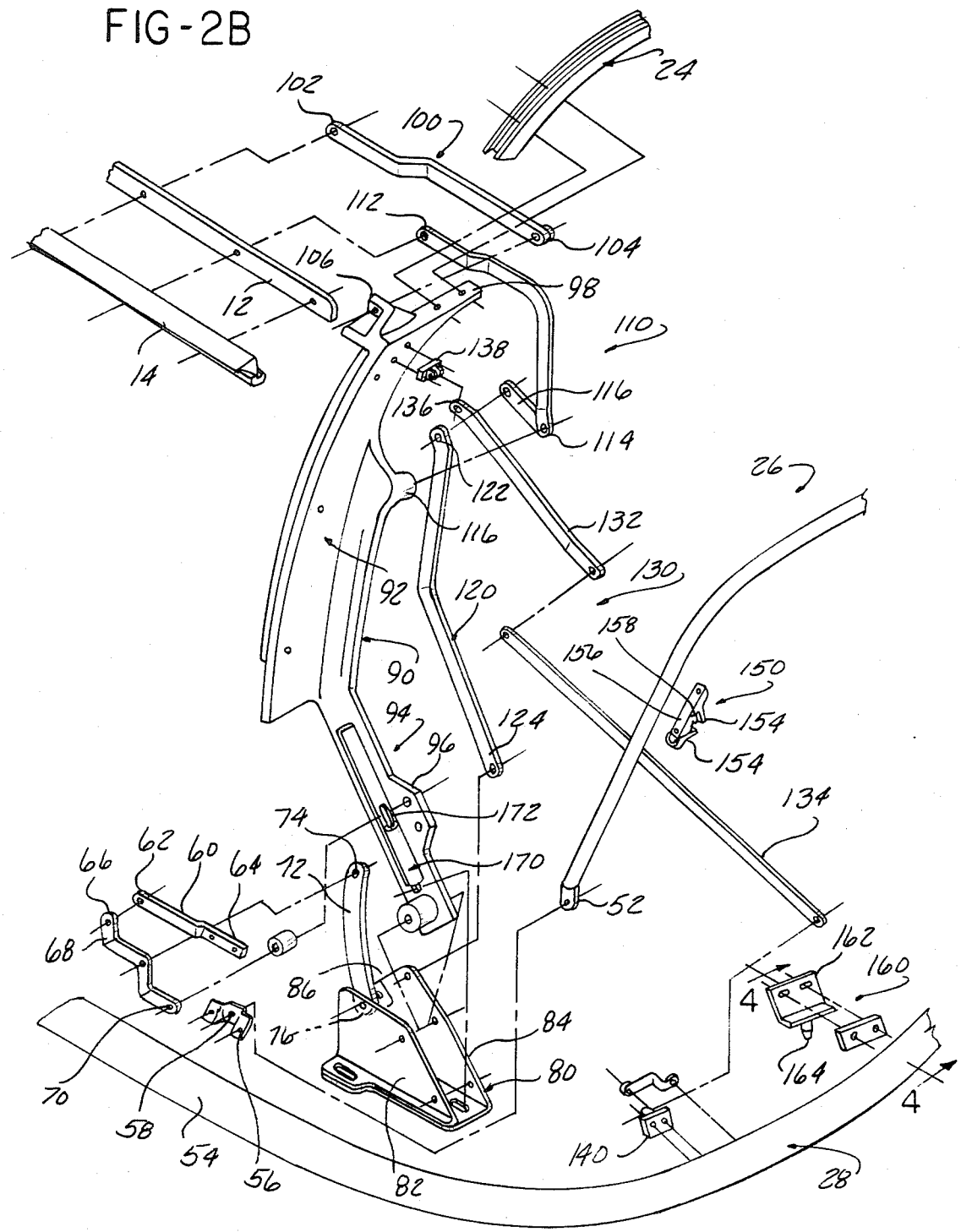

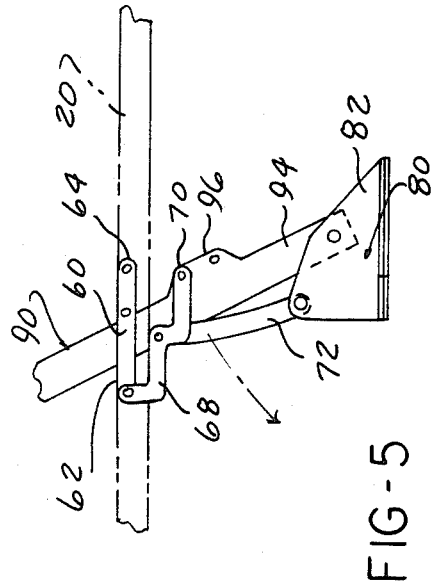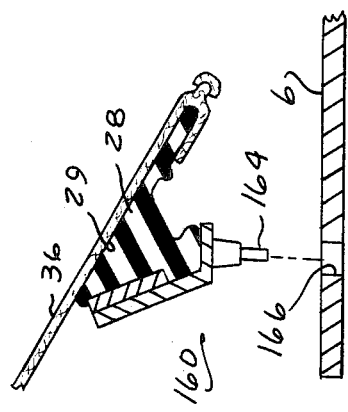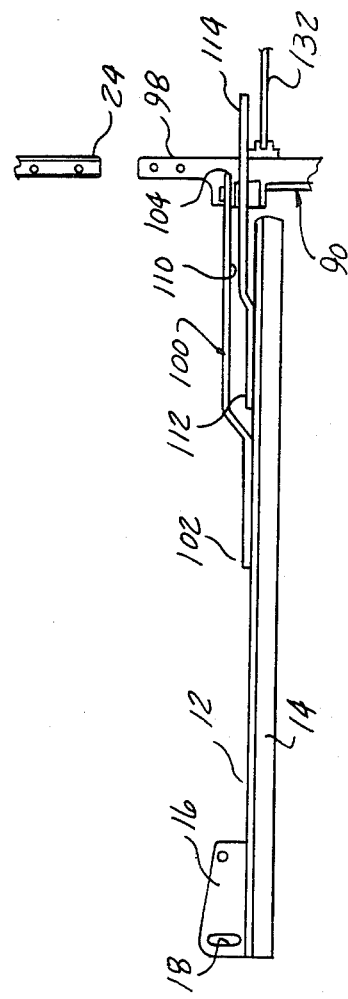

CONVERTIBLE TOP STRUCTURE

BACKGROUND OF THE INVENTION

1. Field of the Invention

The present invention relates to vehicles have a convertible top and, more specifically, to vehicles having a manually operated vehicle top.

2. Description of the Prior Art

Convertible tops mounted on vehicles, such as automobiles, typically are available in two types; namely, a power operated or a manually operated convertible top. The manually operated convertible top structure is suited for smaller vehicles, such as vehicles having two front seats or a relatively small back seat. Typically, such manually operated convertible top structures include a tonneau or pivotal panel which is positioned rearward of the vehicle passenger compartment in front of the rear deck or rear deck lid of the vehicle. The tonneau is pivotally connected to the vehicle so as to be selectively urged upward and rearward from the passenger compartment. The rear portion of the manually operated convertible top is able to be pivoted upward toward the front of the vehicle such that the tonneau can be raised rearward uncovering a space in the interior of the vehicle and the entire convertible top structure may be pivoted rearward into a lowered, folded position within the interior of the vehicle. The tonneau is then lowered back to its original, lowered position covering the folded convertible top structure.

Since the rear portion of the convertible top rests on the tonneau when the top is deployed in its raised position, latches and locating pins have been previously employed to sealingly and securely attach the rear portion of the convertible top to the tonneau. Typically, the locating pins and latches are mounted on both outside corners of the rear of the top and engage mating members and apertures in the tonneau to locate and releasably latch the rear edge of the convertible top to the tonneau. Such locators and latch mechanisms require extra manufacturing steps since a portion of the latches must be mounted in the tonneau. This presents an unsightly appearance when the top is in its lowered position since a portion of the latch mechanism is exposed on the tonneau.

Such manually operated convertible tops as well as power convertible tops are typically constructed with a pair of side rails formed of a plurality of articulated sections and a plurality of transversely extending crossbows which form a frame over which the flexible top is mounted. A control linkage formed of a plurality of pivotally connected links is attached to each side rail and the vehicle body structure to control the selective folding and unfolding of the convertible top. Due to the number of individual components in the side rails, a number of separate links must be provided in the linkages to precisely control the movement of each side rail section and the attached top. This complicates the entire convertible top structure due to the number of individual components and increases its manufacturing costs.

Thus, it would be desirable to provide a manually operated convertible top structure which fixedly positions the rear portion of the convertible top on the tonneau when the convertible top is in its raised position without requiring a latch mechanism or a portion thereof to be mounted in the tonneau. It would also be desirable to provide a manually operated convertible top structure which has a simplified construction and a minimal number of components for ease of operation and reduced manufacturing costs.

SUMMARY OF THE INVENTION

The present invention is a convertible top structure for a vehicle. The convertible top structure is manually operated and suited for mounting on a vehicle having a pivotal panel or tonneau located rearward of the passenger compartment on which the rear portion of the convertible top rests when the convertible top is in its raised position. The tonneau may be pivoted rearward to enable the convertible top to be folded and stowed in the interior of the vehicle below the tonneau.

The convertible top structure of the present invention includes first and second spaced side rails each located above one side of the vehicle. Each of the side rails is formed of an integral, one piece member. A plurality of crossbows extend transversely across the vehicle and, in conjunction with the side rails form a frame over which a flexible convertible top is disposed.

A pair of substantially upright rear rails are pivotally attached to a mounting bracket mounted on the internal vehicle body structure and to the rear end of the side rails. The two rearmost crossbows are pivotally attached to the vehicle body structure or the mounting bracket to permit upward pivoting movement of the rearmost crossbows of the convertible top so as to enable the tonneau to be pivoted rearward and permit manual folding of the entire convertible top into the interior of the vehicle below the tonneau.

Means are provided for fixedly positioning the rearmost crossbow on the tonneau of the vehicle when the convertible top is in its raised position. The positioning means, one of which is located on each side of the vehicle, includes a linkage connected between the rear rail and the rearmost crossbow. Preferably, the linkage forms an over-center latch which securely locks the rearmost crossbow in a sealing position on the tonneau.

Locating means in the form of a pin is mounted to the rearmost crossbow and engages an aperture centrally located in the tonneau for precisely locating the rearmost crossbow of the convertible top with respect to the tonneau when the convertible top is moved to its raised position.

Additional latch means are provided for releasably latching each linkage in its locked position. Preferably, the latch means is attached to the second rearmost crossbow and releasably receives one of the links of the linkage to secure the linkage in its locked position.

The convertible top structure of the present invention also includes means for releasably attaching the front most crossbow to the header bounding the top surface of the vehicle windshield. The attaching means is preferably in the form of a pair of rotatable latch members attached to the windshield header which rotatably engage apertures in the front crossbow of the convertible top.

The second front most crossbow is pivotally attached to the side rails to permit outward movement of the side rails as the roof is moved to its lowered position.

A raising and lowering assist means in the form of a fluid cylinder is mounted on each rear rail to assist in manually raising the convertible top structure and dampening the movement of the convertible top structure as it is being lowered to its folded down position.

The convertible top structure of the present invention provides a unique, manually operated, convertible top of simplified construction. The one piece side rail minimizes the number of components required to control the folding and unfolding of the convertible top. Furthermore, the positioning means employed in the convertible top structure of the present invention securely locks the rearmost crossbow of the convertible top in position on the tonneau of the vehicle without requiring mating latch members in the tonneau and the rearmost crossbow of the convertible top. This simplifies the overall construction of the convertible top structure and provides a more pleasing aesthetic appearance on the vehicle since latch means need not be mounted in the tonneau which would be exposed when the convertible top is in its folded down, stowed position.

BRIEF DESCRIPTION OF THE DRAWING

The various features, advantages and other uses of the present invention will become more apparent by referring to the following description and drawing in which:

FIG. 1 is a side elevational view of the convertible top structure of the present invention shown in its raised position;

FIGS. 2A and 2B are exploded detailed views of the convertible top structure of the present invention illustrating, respectively, the relationship of the side rails with the front cross bow and the control and side rail pivot links, and the left rear corner of the convertible top structure and associated parts;

FIG. 3 is a partial plan view illustrating a top end portion of the convertible top structure shown in FIG. 1;

FIG. 4 is a cross-sectional view generally taken along line 4—4 in FIG. 2;

FIG. 5 is partial, side elevational view of a portion of the linkage employed to pivot the convertible top structure of the present invention between raised and lowered positions; and FIG. 6 is a partial, plan view showing another portion of the control linkage of the convertible top structure of the present invention.

DESCRIPTION OF THE PREFERRED EMBODIMENTS

Throughout the following description and drawing, an identical reference number is used to refer to the same component shown in multiple figures of the drawing.

The present invention is a convertible top structure which is manually operated and mountable on a vehicle having a pivotal panel or tonneau 6 mounted behind the vehicle passenger compartment and in front of the rear deck or deck lid 8 of the vehicle. The tonneau 6 covers an interior cavity or well behind the rear seat or seats of the vehicle into which the convertible top may be stowed in a lower, folded position. In a raised position, the convertible top structure of the present invention completely encloses the vehicle passenger compartment between the tonneau 6 and a header 4 bounding the top edge of the windshield 33 of the vehicle.

Referring now to FIGS. 1 and 2A and 2B, there is illustrated in detail the convertible top structure 10 of the present invention. The convertible top structure 10 shown in FIG. 1 is depicted in its raised position completely covering the vehicle passenger compartment. For clarity, and since the convertible top structure 10 is identically constructed about the longitudinal center line of the vehicle, only one side of the convertible top structure 10 will be illustrated and described hereafter. It will be understood, however, that an identical arrangement and interconnection of components is employed on the opposite not shown side of the convertible top structure 10.

As shown in FIGS. 1 and 2A and 2B, the convertible top structure 10 includes first and second spaced side rails, such as side rail 12. The side rail 12 is preferably a one piece, rigid member which extends substantially along the entire side of the vehicle above the side and/or door windows of the vehicle. While a single piece rigid member is preferred for the side rail 12, multiple members may be joined together to form a rigid, integral side rail assembly. A side rail seal retainer 14 is attached to the outer side surface of the side rail 12. The seal retainer 14 receives a seal, not shown, for sealingly attaching the sides of the convertible top structure 10 to the upper edges of the vehicle side windows.

As shown in FIG. 2A a pad 16 is attached to the inside edge of the front end portion of the side rail 12. The pad 16 has a laterally extending slot 18 formed therein.

The convertible top structure 10 of the present invention also includes a plurality of spaced, transversely extending crossbows. Although any number of crossbows may be employed depending upon the length of the vehicle, five crossbows, such as first, second, third, fourth and fifth crossbows 20, 22, 24, 26 and 28, respectively, are employed in a preferred embodiment of the convertible top structure 10 of the present invention.

The first or front most crossbow 20 has a wide planar form with a depending center portion 31. The front edge of the fabric convertible top 36 is attached by suitable adhesive to the upper front edge of the first crossbow 20.

The first crossbow 20 sealingly engages, when in the raised position, to an edge of a hollow header 32, which forms a part of the vehicle body structure surrounding the vehicle windshield 33. A suitable seal 35 is employed to sealingly mount the frontmost crossbow 20 to the header 32.

The second crossbow 22 is spaced rearward from the first crossbow 20. The second crossbow 22 has a generally U-shaped, channular configuration. The outer end 40 of the second crossbow 22 is pivotally connected to a pad 42 mounted on the end of the front crossbow 20. An L-shaped pivot link 44 is fixedly connected to the outer end 40 of the second crossbow 22 and pivotally connected by means of a pivot pin to a bracket 46 mounted on the end of the pad 42. A fastener, such as a screw 48, extends through the pad 42 into the slot 18 in the pad 16 attached to the side rail 12. This permits laterally outward movement of the side rail 12 as the convertible top structure 10 is moved rearward to its lowered, folded position.

As shown in FIGS. 1 and 2B, the third crossbow 24 likewise has a U-shaped channular configuration. The outer end of the third crossbow 24 is fixedly connected by means of fasteners to a flange formed on a rear rail, which will be described in greater detail below.

The fourth crossbow 26 has a generally planar configuration and is pivotally connected at its outer ends 52 to the fifth crossbow 28.

The fifth crossbow 28, as shown in FIG. 4, has a channular configuration which securely receives the bottom edge of the foldable top 36. In a plan view, the fifth crossbow 28 has a U-shaped configuration conforming it generally to the top shape of the tonneau 6 of the vehicle which it overlays in sealing engagement as described hereafter.

The crossbows 20, 22, 24, 26 and 28 in conjunction with the side rails 12 form a foldable frame over which the flexible, folding top 36 is disposed and connected thereto by conventional attachments.

As shown in FIGS. 1 and 2B, the fourth crossbow 26 is pivotally connected at its outer end 52 to an end portion 54 of the fifth crossbow 28. A mounting bracket 56 having a pair of spaced apertures which receive suitable fasteners is mounted to the inside edge of the fifth crossbow 28. A centrally located aperture 58 in the bracket 56 pivotally receives the outer end 52 of the fourth crossbow 26 for pivotally mounting the fourth crossbow 26 to the fifth crossbow 28.

The fifth crossbow 28 has an angular cross-section as shown in FIG. 4. The inner surface of the fifth crossbow 28 is formed with a rectangular-shaped channular slot 29 extending completely therealong. The channel 29 provides a convenient mounting location for brackets, fasteners, etc., as described hereafter.

The fifth crossbow 28 is likewise pivotally connected to the vehicle. A generally planar slat 60 having an off-set center portion includes first and second ends 62 and 64. Apertures are formed in the second end 64 of the slat 60 for fastening the slat 60 to the inside surface of the fifth crossbow 28 adjacent the end 54 of the fifth crossbow 28. The first end 62 of the slat 60 is pivotally connected to a first end 66 of a pivot link 68. The pivot link 68 has a generally stepped configuration with a first end 66 and a second end 70. The second end 70 is pivotally connected to the rear rail, as described hereafter. An intermediate portion of the pivot link 68 is pivotally connected to a control link 72. The control link 72 has first and second ends 74 and 76, respectively. The first end 74 of the control link 72 is pivotally connected to an intermediate portion of the pivot link 68. The control link 72 has a generally arcuate form with the second end 76 connected to a mounting bracket as described hereafter.

The pivot link 68 and the control link 72 cooperate to provide pivoting action of the fifth crossbow 28 with respect to the tonneau 6 of the vehicle. This enables the fifth crossbow 28 to be pivoted upwards in a counter clockwise direction about its front ends 54 to enable the tonneau 6 to be pivoted rearward as described hereafter. Also, the pivot link 68 and the control link 72 enable the front end 54 of the crossbow 28 to be pivoted downward into the space or well within the interior of the vehicle to stow the convertible top structure 10 in its folded portion within the vehicle.

As shown in FIGS. 1 and 2A, the convertible top structure 10 is provided with means for mounting the convertible top structure 10 to the interior body structure of the vehicle. The mounting means, noted in general by reference number 80, comprises a generally U-shaped bracket having spaced side walls 82 and 84 and an interconnecting bight portion 86. A plurality of aligned and spaced apertures are formed in the side walls 82 and 84 for receiving pivot connections as described hereafter.

Also, the convertible top structure 10 of the present invention includes first and second rear rails, such as rear rail 90. The rear rail 90 has a generally arcuate form with an upper portion 92 and a lower portion 94. The lower portion 94 is formed with an upstanding edge flange 96 which includes apertures for receiving pivot connections as described below.

The rear rail 90 is oriented substantially upright within the vehicle and includes at its upper end a horizontally extending flange 98 which receives the outer end of the fourth crossbow 24 via suitable fasteners.

As shown in FIGS. 2A and 6, a linkage is provided for controlling the pivotal movement of the side rail 12 and the rear rail 10. The linkage includes a side rail control link 100 having first and second ends 102 and 104. The control link 100 is off set in the center. The first end 102 of the control link 100 is pivotally connected to an intermediate portion of the side rail 12. The second end 104 of the control link 100 is pivotally connected to an upstanding flange 106 on the upper end of the rear rail 90.

A side rail pivot link 110 has first and second ends 112 and 114, respectively. The pivot link 110 has a generally L-shaped configuration and is pivotally connected at the first end 112 to a rear end portion of the side rail 12. The second end 114 of the pivot link 110 is pivotally connected to a boss 116 mounted on the upper portion 92 of the rear rail 90.

A balancing link 120 having an angular shape is pivotally connected at a first end 122 to an intermediate link 116 fixedly connected to the first end 114 of the pivot link 110 and extending outward therefrom. A second end 124 of the balancing link 120 is pivotally connected to the bight portion 86 of the mounting bracket 80. The control link 100, the pivot link 110 and the balancing link 120 cooperate to control the pivoting movement of the side rail 12 and the rear rail 90 between raised and lowered position.

Referring again to FIGS. 1 and 2B, the convertible top structure 10 includes means for fixedly positioning the rearmost or fifth crossbow 26 on the tonneau 6 of the vehicle when the convertible top structure 10 is deployed in its raised position. Positioning means, denoted in general by reference number 130, is provided to positively lock the fifth crossbow 28 in a fixed position with respect to the top surface of the tonneau 6 thereby preventing movement of the rear portion of the convertible top structure 10 during movement of the vehicle.

In a preferred embodiment, the positioning means 130 is a linkage formed of first and second links 132 and 134, respectively. The first and second links 132 and 134 are pivotally connected at adjacent ends. The first link 132 is pivotally connected at an opposite end 136 to a mounting bracket 138 attached to the upper portion 132 of the rear rail 90. The opposite end of the second link 134 is pivotally connected to a mounting bracket 140 attached to the inside surface of the fifth crossbow 28.

The first and second links 132 and 134 operate as an over-center latch which, when the convertible top structure 10 is latched to the front header 32 of the vehicle, thereby fixedly positions the rear rail 90 in its upright position and positively locks and forces the fifth crossbow 28 into sealing engagement with the top surface of the tonneau 6. Not only does this arrangement provide a seal between the lower rear portion of the convertible top and the tonneau 6, it also prevents movement of the convertible top structure 10 with respect to the tonneau 6 with respect to the vehicle.

In order to positively maintain the first and second links 132 and 134 in their over-center locked position, latch means 150 is mounted on the fourth crossbow 26 adjacent the top and side portions of the fourth crossbow 26. The latch means 150 is formed of a bracket having two flanges 152 and 154 extending angularly outward from an integral base 156. The flanges 152 and 154 surround a slot 158 which receives one of the links 132 and 134 in a snap-type fit. Pressure applied to one of the flanges 152 and 154 causes the outer portion of the flange to move outward thereby enabling the link trapped therein to be released from the latch 150.

In order to center the fifth crossbow 28 on the tonneau of the vehicle and to assist in preventing movement of the fifth crossbow 28 and the convertible top structure 10 during movement of the vehicle, means are provided for positively locating the fifth crossbow 28 with respect to the tonneau 6. The locating means, denoted in general by reference number 160 in FIGS. 2B and 4, comprises a generally L-shaped bracket 162 having a depending locating pin 164 mounted on a bottom surface thereof. The locating pin 164 is adapted to be removably inserted into a correspondingly shaped aperture 166 formed centrally in the tonneau. One leg of the L-shaped bracket 62 is fixedly secured to an inside surface of the fifth crossbow 28 as shown in FIG. 2. In this manner, when the convertible top structure 10 is moved to its raised position, the locating pin 164 may be inserted into the aperture 166 in the tonneau 6 thereby centering the fifth crossbow 28 with respect to the tonneau 6.

Also shown in FIG. 2B is a mounting bracket 140 which is attached to an outer corner of the fifth crossbow 28. A pivotal link is attached at one end to the mounting bracket 140 and at a second end to a stay pad strip, not shown, attached to the inside longitudinal seams of the fabric top 36. This enables tension to be applied to the top 36 when in its extended, raised position.

As shown in FIG. 2, the convertible top structure 10 of the present invention is provided with means for assisting the movement of the convertible top structure 10 during raising and lowering operations. The assisting means, denoted in general by reference number 170, is in the form of a fluid cylinder, such as a gas cylinder, having an extensible rod 172. One end of the rod 172 is attached to the flange 96 on the rear rail 90. The opposite end of the cylinder 170 is fixedly mounted to the mounting bracket 80.

Thus, pressurized fluid or gas within the cylinder 170 will urge the rear rail 90 upward during the raising of the convertible top structure 10 thereby easing the raising operation. Likewise, during lowering of the convertible top structure 10, resistance provided by the prssurized fluid within the cylinder 170 will slightly resist or oppose downward movement of the rear rail thereby dampening jerky or quick movements of the rear rail 90 and the attached convertible top structure 10.

In FIG. 1, the convertible top structure 10 is depicted in its raised position completely enclosing the passenger compartment of the vehicle. The front crossbow 30 of the convertible top structure 10 is latched to the windshield header 32 by means of pivotal latches 180 attached to the windshield header 32 and rotatably engaging apertures 182 in the first crossbow 20, as shown in FIG. 2A. Furthermore, the fifth crossbow 28 is held in a fixed, locked position on top of the tonneau of the vehicle. In order to lower the convertible top structure 10 to its folded position within the interior of the vehicle, the link 132 or 134 is released from the latch 150 on the fourth crossbow 28 and the links 132 and 134 are urged outward at their common pivot connection thereby breaking the over-center lock connection between the rear rail 90 and the fifth crossbow 28. This enables the fifth crossbow 28 and the fourth crossbow 26 to be pivoted upward in a counter clockwise position as shown by the arrow 190 in FIG. 1.

The fifth crossbow 28 is then pivoted upward a sufficient distance to enable the tonneau 6 to be pivoted about its rear end in a clockwise direction shown by arrow 192 thereby opening the interior of the vehicle. When the tonneau 6 has been rotated in the direction of arrow 192 a sufficient distance, the fifth crossbow 28 may be lowered into the interior of the vehicle. During this lowering movement, the fifth crossbow 28 through the pivot link 68 and the control link 74 is pivoted downward and forward in a counter clockwise direction about the mounting bracket 80 until it is in a substantially horizontal position within the interior of the vehicle. During this movement of the fifth crossbow 28, the fourth crossbow 26 pivots in a clockwise direction rearward to an overlaying portion over the fifth crossbow 28.

The rear rail 90 may then be urged rearward in a clockwise direction indicated by the arrow 194 in FIG. 1. During such movement of the rear rail 90, the side rail 12 pivots through the connection of control link 100, the pivot link 110 and the balancing link 120 about the upper end of the rear rail 90. This causes the side rail 12 and the attached front portions of the flexible top 36 to pivot in a counterclockwise direction indicated by arrow 196 in FIG. 1 and also laterally outward such that the front portions of the flexible top 36 overlay the folded portions between the third, fourth and fifth crossbows 24, 26 and 28, respectively.

A reverse operation is employed to raise the folded convertible top structure 10 to its fully extended or raised position. In this movement, the rear rail 90 is urged upward in a counterclockwise direction until the front crossbow 20 can be latched to the front header 4 of the vehicle. Again, the fifth crossbow 28 is pivoted upward in a clockwise direction to allow sufficient space for the tonneau 6 to be pivoted downward to its normal, horizontal position. The fifth crossbow 28 is then pivoted downward in a clockwise position until it engages the top surface of the tonneau 6. The links 132 and 134 are then brought into their over-center locking position with one of the links 132 and 134 latched into the latch means 150 thereby securely engaging the fifth crossbow 28 with the top surface of the tonneau 6.

In summary, there has been disclosed a unique manually operated convertible top structure which provides a positive lock between the pivotal rearmost crossbow of the convertible top structure and the pivotal tonneau of the vehicle when the convertible top structure is extended to its raised position. The convertible top structure of the present invention, by employing a single piece, rigid, side rail can be constructed of a reduced number of components thereby reducing the number of control links required to control the pivotal movement of the side rails of the convertible top structure.

What is claimed is:

1. A convertible top structure movable between raised and lowered positions on a vehicle having a pivotal tonneau mounted rearward of the vehicle passenger compartment and a header bounding the upper edge of a windshield, the convertible top structure comprising:
   first and second spaced side rails, each associated with one side of the vehicle, each of the first and second side rails being formed of rigid, single piece member;

first, second, third, fourth and fifth spaced crossbows extending transversely across the vehicle;

a flexible top covering attached to the first, second, third, fourth and fifth crossbows and the first and second side rails;

means for mounting the convertible top structure to the vehicle;

first and second substantially upright rear rails pivotally connected at one end to the mounting means and at an opposed end to the rear end of the first and second side rails;

the fifth crossbow being pivotally connected to the mounting means;

the fourth crossbow being pivotally connected to the fifth crossbow;

first and second links pivotally connected at a common end, the opposite end of the first link being pivotally connected to one of the rear rails, the opposite end of the second link being pivotally connected to the fifth crossbow, the first and second links forming an over-center lock to fixedly position the fifth cross bow in engagement with the top surface of the tonneau of the vehicle when the convertible top structure is in its raised position;

a locator pin centrally located on the fifth crossbow and releasably engageable with an aperture formed centrally in the tonneau for locating the fifth crossbow with respect to the tonneau of the vehicle;

latch means mounted on the fourth crossbow for releasably receiving one of the first and second links when the convertible top structure is in its raised position and the fist and second links are disposed in their over-center lock position;

means for latching the first crossbow to the windshield header of the vehicle;

means for assisting the raising and lowering of the convertible top structure, the assisting means comprising fluid cylinder means mounted between the rear rails and the mounting means for urging the rear rail upwards when the convertible top structure is moved to its raised position and cushioning the descent of the rear rail when the convertible top structure is lowered to its folded position;

means for pivotally attaching the front end of the first and second side rails to the first and second crossbow to permit lateral outward movement of the first and second side rails as the convertible top structure is moved to its lowered position, the means for pivotally connecting the ends of the second crossbow to the first and second rails comprises:

(1) a transverse slot formed in the end of each first and second side rail;

(2) fastening means extending through the first crossbow and slidingly movable within the slots in the first and second side rails; and (3) a pivot pin pivotally connected at a first end to the first crossbow and fixedly connected at a second end to the end of the second crossbow for allowing pivotal movement between ends of the second crossbow and the first and second side rails as the convertible top structure is moved between the raised and lowered positions.

2. The convertible top structure of claim 1 wherein the fifth crossbow is disposed in sealing engagement with the tonneau when the convertible top structure is in the raised position.

3. A convertible top structure movable between raised and lowered positions on a vehicle having a pivotal tonneau mounted rearward of the vehicle passenger compartment and a header bounding the upper edge of a windshield, the convertible top structure comprising:

first and second spaced side rails, each associated with one side of the vehicle, each of the first and second side rails being formed of a rigid, single piece member;

first, second, third, fourth and fifth spaced crossbows extending transversely across the vehicle;

a flexible top covering and attached to the first, second, third, fourth and fifth crossbows and the first and second side rails;

means for mounting the convertible top structure to the vehicle;

means mounted on the fourth crossbow for releasably receiving one of the first and second links when the convertible top structure is in its raised position and the first and second links are disposed in their over-center lock position;

means for latching the first crossbow to the windshield header of the vehicle;

means for assisting the raising and lowering of the convertible top structure, the assisting means comprising fluid cylinder means, mounted between the rear rails and the mounting means, for urging the rear rail upwards when the convertible top structure is moved to its raised position and cushioning the descent of the rear rail when the convertible top structure is lowered to its folded position; and means for pivotally attaching the front end of the first and second side rails to the first and second crossbow to permit lateral outward movement of the first and second side rails as the convertible top structure is moved to its lowered position comprising;

a transverse slot formed in the end of each first and second side rail;

fastening means extending through the first crossbow and slidingly movable within the slots in the first and second side rails;

a pivot pin pivotally connected at a first end to the first crossbow and fixedly connected at a second end to the end of the second crossbow for allowing pivotal movement between ends of the second crossbow and the first and second side rails as the convertible top structure is moved between the raised and lowered positions.

* * * * *